June 9, 1936.  C. E. STEBBINS  2,043,935
CURING CONNECTION
Filed Nov. 30, 1932   2 Sheets-Sheet 1

Clyde E. Stebbins, Inventor

By

Attorney

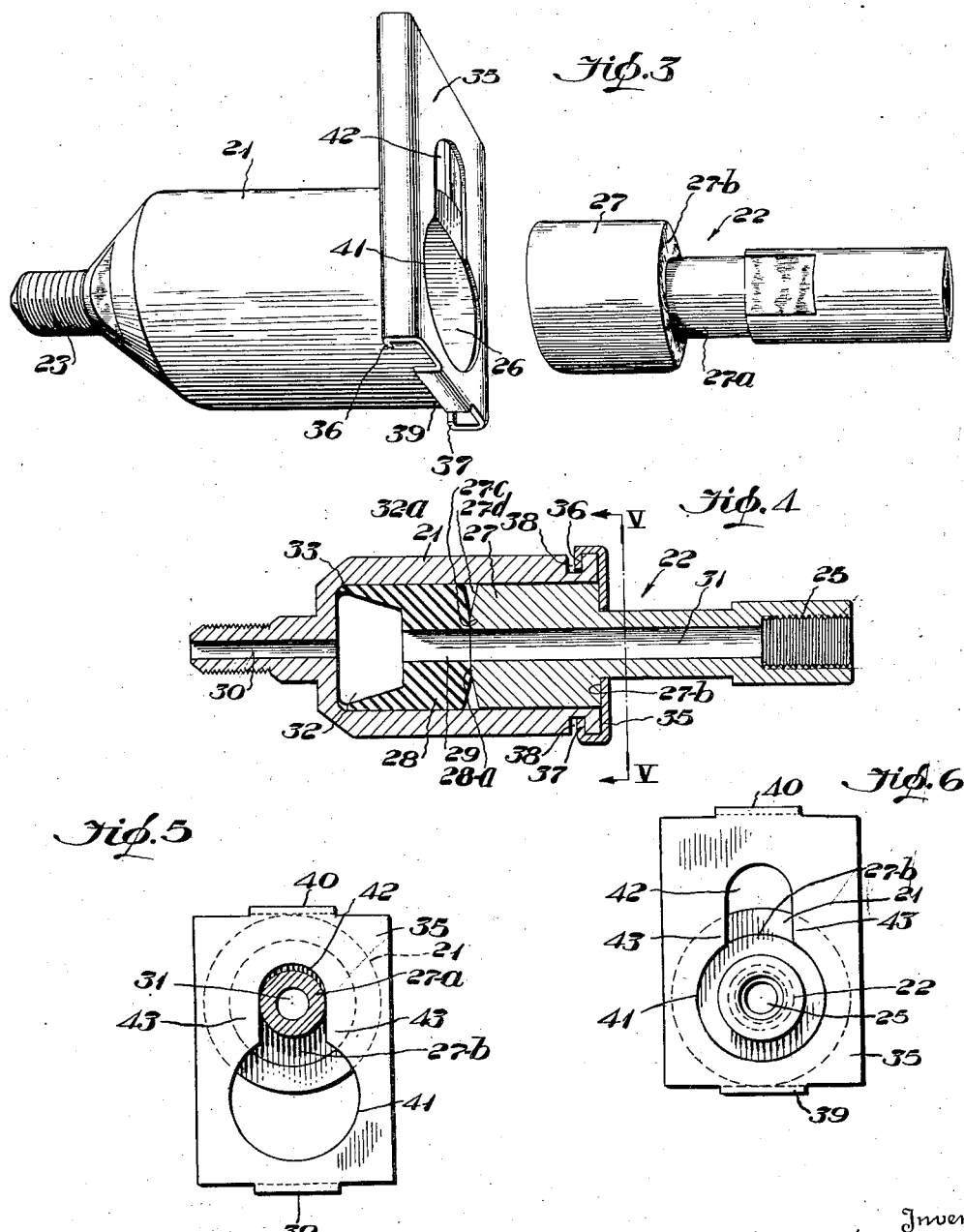

Patented June 9, 1936

2,043,935

UNITED STATES PATENT OFFICE 2,043,935

CURING CONNECTION

Clyde E. Stebbins, Cuyahoga Falls, Ohio, assignor to Wingfoot Corporation, Akron, Ohio, a corporation of Delaware Application November 30, 1932, Serial No. 645,023

4 Claims. (Cl. 285—168)

This invention relates to curing connections, and it refers more particularly to detachable connections for use in vulcanizing apparatus such as are employed in vulcanizing pneumatic tires, inner tubes and other inflatable articles.

While the invention may be employed in different kinds of vulcanizing apparatus, it is especially adapted for use in what are known as "pot heaters", wherein a plurality of separate vulcanizing molds are stacked and subjected to vulcanizing heat by the circulation of steam or other heating medium around them. At the same time, the pneumatic tires or other articles which are to be vulcanized within the molds are subjected to pressure by inflation within their respective molds, such inflation being accomplished by a suitable pressure fluid such as compressed air, steam, hot water, or the like. It is, of course, necessary that the couplings so employed be substantially fluid-tight, and this is particularly true when the inflating medium is of an entirely different kind from the heating medium. It is also desirable that these connections be capable of being "made" and "broken" quickly and with a minimum amount of manual effort. Some of the prior art couplings which have been used for this purpose have embodied screw-threaded elements, while others have had conventional bayonet joints of one kind or another, and while such couplings have been serviceable, they have given rise to some objections which the present invention overcomes.

One object of the present invention is to provide a curing connection which is especially adapted for vulcanizing apparatus and which can be quickly "made" and "broken" with a minimum amount of manual effort.

Another object is to provide such a connection which will be entirely fluid-tight in service.

Another object is to provide such a connection which is extremely simple in construction, strong and durable in use, and a substantial advance in the art to which the invention relates.

More specifically, the invention contemplates a coupling unit which comprises a pair of cooperating members, one in the form of a socket and the other in the form of a plug adapted to be received therein, and each of said members being apertured to permit the passage of a pressure fluid. In the bottom of the socket member there is a packing ring which is abutted by the inner end of the plug member when the latter is in place, and associated with one of the cooperating members is a transversely slidable latch plate which serves to lock the parts in assembled relation. The packing ring is so formed that it will be expanded by pressure of the fluid passing through the coupling, thus effecting a tight seal.

The foregoing objects, features and advantages of the invention will be readily apparent as the following description proceeds in conjunction with the accompanying drawings, wherein one form of the invention has been shown by way of illustration, and wherein Fig. 1 is a fragmentary side elevation, partly in transverse section of one form of vulcanizing equipment fitted with curing connections, in accordance with this invention;

Fig. 3 is a perspective view of the improved curing connection per se, with the cooperating members thereof disconnected;

Fig. 4 is a longitudinal, sectional view through the improved curing connection and showing the parts locked in assembled relation;

Fig. 5 is a transverse, sectional view taken on line V—V of Fig. 4, and

Fig. 6 is an end view of the curing connection with the large plate in its unlocked position.

Figure 1:
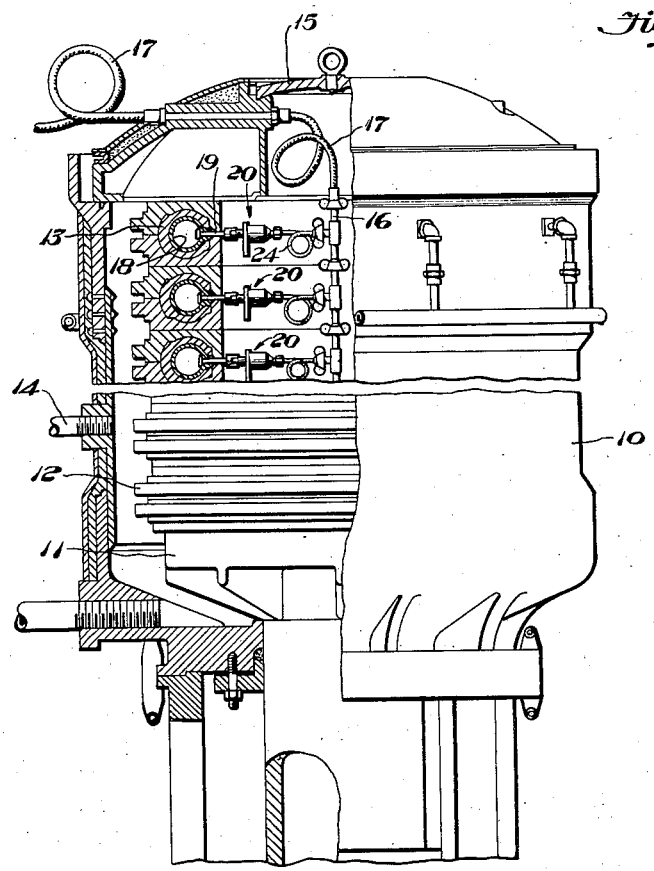
Figure 2:
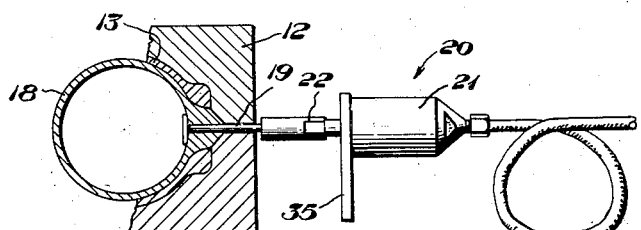
Fig. 2 is a similar but more fragmentary view drawn on a larger scale.

By way of illustration, the invention has been shown in Fig. 1 in conjunction with a conventional pot heater 10 used for vulcanizing pneumatic tire casings. Such pot heater, as is well known to those skilled in the art, comprises a vertically disposed, substantially cylindrical vessel having in its closed lower end a hydraulic ram 11 upon which are stacked a plurality of annular, sectional molds 12, each mold being provided with suitable cavities for confining the tires 13 to be vulcanized by the application of heat and pressure. The heating is effected by the circulation of steam or other suitable heating medium through the interior of the heater and around the mold sections 12, such heating medium being introduced as at 14 through a suitable pipe leading from any appropriate source of supply. The upper end of the pot heater is closed by a removable cover 15, which, when locked in place serves as an abutment against which the ram 11 maintains the molds in stacked relation and each tightly closed.

During the vulcanizing operation the tire casings 13 are tightly pressed against the cavity walls of their respective confining molds by being inflated with a pressure fluid supplied from a sectional manifold 16, which, in turn, is connected to a suitable source of supply by means of flexible hose 17, or the like. This inflating fluid may be either compressed air, steam, hot water, carbon dioxide or otherwise, as desired. In the illustrated embodiment, the inflation of the tires 13 is accomplished by the use of inflatable members 18 which are also known as air-bags or curing bags, each of such inflatable members being provided with one or more tubular stems 19 extending through the inner peripheral wall of the confining mold 12 and connected to the manifold 16 by means of the improved coupling or curing connection 20, which constitutes the essence of this invention. At this point it is well to note that the improved coupling may be used with other forms of vulcanizers, such as watch case heaters, and they are not restricted to use with any specific inflating medium or with any particular kind of inflating bag within the tire.

Referring more particularly to Figs. 2 to 6, inclusive, of the drawings, it will be seen that the improved coupling 20 comprises a pair of cooperating members 21 and 22, the former being provided with a short, screw-threaded extension 23 to facilitate its connection with a flexible tube 24 leading from the manifold 16, and the member 22, generally known as an adapter, having an internally screw-threaded extension 25 which is adapted for connection with the tubular inflation stem 19 previously referred to and associated with the inflatable member 18. The member 21 is in the nature of a socket having a substantially cylindrical recess 26 extending inwardly from one end thereof and adapted to snugly receive an enlarged cylindrical head portion 27 of the member 22. The end of said head portion 27 has a flat central annular surface 27c surrounded by a chamfer or bevel 27d for a purpose to be hereinafter pointed out.

Disposed in the bottom of the cylindrical recess 26 is a packing member 28 which may preferably be molded or otherwise formed and cured of soft, resilient rubber and which is so proportioned that it will be abutted by the annular surface 27c on the inner end of the head portion 27 of the member 22 when the latter is in place within the recess 26. One end of this packing member 28 has its edge portions beveled off, leaving a flat central annular surface 28a of substantially the same size as the surface 27c by which it is abutted. The body of the member 28 is provided with a substantially central hole 29 adapted for alinement with uninterrupted fluid passageways 30 and 31, respectively within the members 23 and 22, so that when the parts are assembled together the inflating fluid may freely pass in either direction entirely through the coupling between the flexible tube 24 and the tubular inflation stem 19. The other end of the packing member 28 is formed with a frusto-conical recess 32 providing flexible annular lip portions 33, which, due to their distorted and compressed condition, are adapted to be readily self-sealing and to be readily pressed outwardly by the inflating fluid, and thus held in tight sealing engagement with the walls of the recess 26, whereby to effect a tightly sealed joint. Surrounding the hole 29 in the bottom of the recess 32, there is a flat annular surface 32a which is larger than the surfaces 27c and 28a, and by reason of this construction, the cumulative pressure of the fluid on the greater surface 32a will act to insure a positive pressure of the surface 28a against the surface 27c and thus effect a tight seal at this point. These parts are, in fact, so proportioned that the union between the end of the adapter and the packing ring will be sealed mechanically by assembling before the inflating fluid is caused or permitted to flow through the coupling, and this sealed union will be augmented by the pressure of the fluid tending to expand the packing ring.

It is desirable that the members 21 and 22 be capable of being quickly locked and unlocked with respect to each other, and for this purpose there is provided a novel and simplified locking means. Such locking means comprises a substantially rectangular metallic plate 35, which is mounted upon the body of the member 21, said plate being transversely slidable across the end of said member 21 and guided in such sliding movement by in-turned flanges 36 and 37 formed on its opposite longitudinal edges. These flanges 36 and 37 are disposed in suitably formed grooves 38 at opposite sides of the member 21, and the sliding movement of the plate 25 is limited by additional flanges 39 and 40 which are formed on the opposite ends of the plate 35. In the body of the plate 35 there is formed a substantially keyhole-shaped opening which has a circular portion 41 of a diameter substantially equal to the diameter of the head portion 27 of the member 22, and an extending slot 42 which is considerably narrower than said circular portion 41 but sufficiently wide to clear or slide over the shank portion 27a of the member 22.

When the plate 35 is in its unlocked position limited by the end flange 39 abutting against the corresponding side of the member 21, the circular opening 41 is substantially in axial alinement with the recess 26 and thus permits the insertion and removal of the head portion 27 of the member 22. On the other hand, when the plate 35 is in its locking position, as shown in Fig. 5 and as limited by the engagement of the end flange 40 against the corresponding side of the member 21, the opening 41 will be off center from the recess 26, and in the event that the head portion 27 of the member 22 is disposed within said recess at this time, the portions 43 of the plate at the opposite sides of the slot 42 will engage against portions of the end 27b of the plug and maintain the same tightly against the packing member 28 in the bottom of the recess.

In the use of the invention, a minimum amount of manual effort is required for making and breaking the connection between the manifold 16 and the inflation stem 19 in the mold. Assuming first that the heater is just being loaded and the connection referred to is to be made, it is only necessary for the attendant to grasp the coupling member 21 in one hand with the plate 35 in its unlocking position, as shown in Fig. 3, and then to push the same against and over the head portion 27 of the coupling member 22 until said head portion 27 is entirely disposed within the recess 26 and in abutting relation with the end of the packing member 28. Thereupon, the attendant need only slide the plate 35 transversely to substantially its other extreme limit of movement, in which condition the parts will be securely locked together and a tightly sealed joint effected. After the vulcanizing operation has been completed, the coupling may be quickly broken or detached by a reversal of the sliding movement of the plate 35 and withdrawal of the socket member 21 from the plug member 22.

From the foregoing it will be evident that a substantial advance has been made in the art to which this invention relates, by the provision of a curing connection which can be quickly and easily made and broken, so that it will be conducive to economy in the labor of loading and unloading of vulcanizing molds. Furthermore, the parts are of such simple construction that they may be manufactured easily at low cost and at the same time the parts are of such rugged construction as to be serviceable over a long period of time. Obviously, the invention is susceptible of various modifications in the details of construction and arrangement of parts, and the right is herein reserved to make such changes as fall within the scope of the appended claims, without departing from the spirit of the invention.

What is claimed is:

1. In combination, a female member having a bore with end and side walls, a male member insertable therein and of a cross-section substantially that of said bore, a cup-shaped packing having a thin, readily flexible lip arranged in said female member with said lip extending away from said male member, the bottom thereof contacting with said male member, and means for holding said male member against longitudinal displacement away from said packing but exerting a sufficient clamping force on said packing to force the lip against the end wall of said bore to deform the same inwardly and make a portion thereof lie against said end wall, said side and end wall being connected by a curved portion against which said lip lies and by which it is deformed under the clamping pressure, and said deformed lip lying closely against said curved portion of said end wall.

2. In combination, a female member having a cylindrical bore and a curved fillet gradually merging with the side wall and extending inwardly toward the axis thereof, a cup-shaped packing ring having a very thin lip portion and of an outside diameter substantially that of said bore and fitting snugly therein with said lip extending toward said fillet, a male member having a head substantially the same as the diameter of said bore and fitting within said bore and abutting against said packing ring to hold said packing ring in place against longitudinal displacement, and means for holding said male member in such a position longitudinally of said bore that said thin lip portion is deformed inwardly by said fillet and lies snugly thereagainst, whereby said lip, in addition to being held by fluid pressure against the side walls and fillet, is additionally held against said fillet by its inherent resiliency under its compression, due to being deformed by said fillet.

3. A device as set forth in claim 2 in which said male member and packing ring are formed to have a clearance space therebetween adjacent their peripheries but being in sealing contact with each other inwardly toward their centers, the male and female members and packing ring having communicating openings therethru for the passage of fluid under pressure.

4. In combination, a female member having a bore, a male member insertable in said female member and of a cross section substantially that of said bore, a cup-shaped resilient packing having a thin, readily flexible lip arranged within said female member with said lip extending away from said male member, the wall of said bore merging with an inwardly and axially sloping shoulder extending away from said lip and adapted to gradually compress said lip radially inward when the latter is forced axially against said shoulder, whereby the lip portion is compressed peripherally and the natural resiliency of said packing member tends to expand said lip to hold the same firmly against said shoulder, and means for holding said male member in such a position that it will retain said packing member with the lip thereof compressed against said shoulder.

CLYDE E. STEBBINS.